(12) United States Patent
Hebgen et al.

(10) Patent No.: US 6,925,237 B2
(45) Date of Patent: Aug. 2, 2005

(54) HIGH FIGURE OF MERIT DISPERSION COMPENSATING FIBER FOR STANDARD SINGLE MODE FIBER AND TRANSMISSION SYSTEM UTILIZING SAME

(75) Inventors: Peter G. Hebgen, Wilmington, NC (US); Snigdharaj K. Mishra, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 140 days.

(21) Appl. No.: 10/670,017

(22) Filed: Sep. 24, 2003

(65) Prior Publication Data

US 2005/0063655 A1 Mar. 24, 2005

(51) Int. Cl.[7] .............................. G02B 6/18; G02B 6/22
(52) U.S. Cl. ........................ 385/124; 385/123; 385/127
(58) Field of Search ................................ 385/123, 124, 385/126, 127

(56) References Cited

U.S. PATENT DOCUMENTS

| | | | |
|---|---|---|---|
| 5,361,319 A | 11/1994 | Antos et al. ................. | 385/123 |
| 5,448,674 A | 9/1995 | Vengsarkar et al. ........ | 385/123 |
| 5,555,340 A | 9/1996 | Onishi et al. ................ | 385/127 |
| 5,568,583 A | 10/1996 | Akasaka et al. ............ | 385/123 |
| 5,673,354 A | 9/1997 | Akasaka et al. ............ | 385/127 |
| 5,742,723 A | 4/1998 | Onishi et al. ................ | 385/127 |
| 5,995,695 A | 11/1999 | Aikawa et al. ............. | 385/123 |
| 5,999,679 A | 12/1999 | Antos et al. ................. | 385/127 |
| 6,031,955 A | 2/2000 | Mukasa et al. ............. | 385/123 |
| 6,178,279 B1 | 1/2001 | Mukasa et al. ............. | 385/123 |
| 6,400,877 B1 | 6/2002 | Kato et al. .................. | 385/123 |
| 6,404,967 B2 | 6/2002 | Arai et al. ................... | 385/126 |
| 6,477,306 B2 | 11/2002 | Kato et al. .................. | 385/123 |
| 6,490,398 B2 | 12/2002 | Gruner-Nielsen et al. .. | 385/123 |
| 6,493,494 B1 | 12/2002 | Rousseau et al. ........... | 385/123 |
| 6,498,887 B1 | 12/2002 | Gruner-Nielsen et al. .. | 385/123 |
| 6,501,892 B1 | 12/2002 | Okuno et al. ................ | 385/127 |
| 6,522,819 B2 | 2/2003 | Shimotakahara et al. ... | 385/123 |
| 6,546,178 B2 * | 4/2003 | Jiang et al. .................. | 385/127 |
| 6,574,407 B2 | 6/2003 | Sillard et al. ................ | 385/123 |
| 6,591,048 B2 | 7/2003 | Mukasa ....................... | 385/123 |
| 6,597,848 B1 | 7/2003 | Berkey et al. .............. | 385/124 |
| 6,668,120 B2 * | 12/2003 | Sillard et al. ................ | 385/123 |
| 6,757,468 B2 * | 6/2004 | Bickham et al. ............ | 385/127 |
| 2001/0028491 A1 | 10/2001 | Mukasa ....................... | 359/161 |
| 2001/0033724 A1 | 10/2001 | Kato et al. ................... | 385/123 |
| 2002/0168160 A1 | 11/2002 | Hirano et al. ................ | 385/123 |

(Continued)

FOREIGN PATENT DOCUMENTS

WO    WO 2004/051332    6/2004    ............ G02B/6/16

OTHER PUBLICATIONS

Grüner–Nielsen, et al. "*Dispersion Compensating Fibers*", Optical Fiber Technology 6, pps. 164–180 (2000).

*Primary Examiner*—John D. Lee
*Assistant Examiner*—Rhonda S Peace
(74) *Attorney, Agent, or Firm*—Randall S. Wayland (57) ABSTRACT

A dispersion compensating optical fiber that includes a segmented core having a central core segment, a moat segment, and a ring segment wherein the ring segment is preferably offset from the moat outer radius, $r_2$, by a ring offset, $X_o$, greater than 0.4 µm. The refractive index profile is selected to provide a total dispersion at 1550 nm of between about −120 and −145 ps/nm/km, and a total dispersion slope at 1550 nm of between about −0.36 and −0.56 $ps/nm^2/km$. The refractive index profile is preferably further selected to provide a kappa, defined as the total dispersion at 1550 nm divided by the dispersion slope at 1550 nm, of between about 250 and 320 nm. Optical transmission systems including the present invention dispersion compensating optical fiber which have residual dispersion less than +/−15 ps/nm per 100 km of standard single mode transmission fiber are also disclosed.

22 Claims, 9 Drawing Sheets

U.S. PATENT DOCUMENTS

| | | | |
|---|---|---|---|
| 2003/0053780 A1 | 3/2003 | Zhang | 385/127 |
| 2003/0063875 A1 | 4/2003 | Bickham et al. | 385/98 |
| 2003/0118307 A1 | 6/2003 | Gruner-Nielsen et al. | 385/127 |
| 2003/0128947 A1 | 7/2003 | Shimotakahara et al. | 385/123 |
| 2003/0138228 A1 | 7/2003 | Gorlier et al. | 385/123 |
| 2003/0147612 A1 | 8/2003 | Jiang et al. | 385/127 |
| 2003/0174987 A1 | 9/2003 | Bickham et al. | 385/127 |

* cited by examiner

HIGH FIGURE OF MERIT DISPERSION COMPENSATING FIBER FOR STANDARD SINGLE MODE FIBER AND TRANSMISSION SYSTEM UTILIZING SAME

BACKGROUND OF THE INVENTION

1. Field of the Invention

The present invention relates generally to optical fiber, and particularly to dispersion compensating optical fibers and systems employing same.

2. Technical Background

Increased demand for higher bit transmission rates has resulted in a large demand for optical transmission systems that can control and minimize dispersion effects. Analysis of common optical transmission systems indicates that while optical transmission systems can tolerate fairly large amounts of residual dispersion at 10 Gbit/second, these systems can tolerate only small amounts of residual dispersion at higher transmission rates of about 40 Gbit/second without causing unwanted signal distortion. Therefore, it is of the utmost importance to accurately control dispersion in such high bit-rate optical transmission systems across the entire wavelength band of interest. Moreover, dispersion control becomes increasingly important as the transfer rate increases. In addition to the need to accurately control dispersion, it is also desirable to compensate for dispersion slope of the transmission fiber as transmission rates approach 40 Gbit/second.

Various solutions have been proposed to achieve the dispersion and dispersion slope values required for compensating standard single mode optical fibers. One favored approach involves housing a dispersion compensating fiber in a dispersion compensating module wherein accumulated dispersion of the transmission fiber is compensated for at the end of the fiber span where the fiber end is accessible. Such modules include a length of dispersion compensating fiber wound onto a spool or reel.

One example of a dispersion compensating fiber used to compensate for standard single mode fiber, such as SMF-28® manufactured and marketed by Corning Incorporated of Corning, N.Y. is described in U.S. Patent Application 2003/0053780. Only a relatively short length of this dispersion compensating fiber is required to compensate for an approximately 100 km length of standard single mode transmission fiber at 1550 nm.

Two important parameters in dispersion compensating modules are Figure of Merit (FOM) and Insertion Loss (IL). As the length of dispersion compensating fiber required to compensate for the dispersion of the transmission fiber increases, so does the attenuation contributed thereby, and, thus, so does insertion loss. Typically, the main contribution to IL is the attenuation of the dispersion compensating fiber itself. FOM is the ratio of the absolute value of dispersion at 1550 nm divided by fiber attenuation at 1550 nm. A high FOM number is desirable, as it is a measure of how much loss is induced by addition of the dispersion compensating fiber to compensate for the accumulated system dispersion of the span including the standard single mode fiber.

Thus, there is a need for a dispersion compensating fiber for compensating dispersion in spans of standard single mode fiber which has increased FOM and lower IL such that the fiber introduces less loss while compensating for accumulated dispersion in the system.

SUMMARY OF THE INVENTION

Definitions

The following definitions and terminology are commonly used in the art.

Refractive index profile—The refractive index profile is the relationship between the refractive index ($\Delta$ %) and the optical fiber radius in microns (as measured from the centerline of the optical fiber).

Segmented core—A segmented core is one that has multiple segments in the physical core, such as a first and a second segment, for example, including any two of the following: a central core segment, a moat segment, and a ring segment. Each segment has a respective refractive index profile and a maximum and minimum refractive index therein.

Effective area—The effective area is defined as:

$$A_{eff} = 2\pi (\int E^2 r dr)^2 / (\int E^4 r dr),$$

wherein the integration limits are 0 to $\infty$, and E is the electric field associated with the propagated light as measured at 1550 nm.

Relative refractive index percent $\Delta$ %—The term $\Delta$ % represents a relative measure of refractive index defined by the equation:

$$\Delta \% = 100 \times (n_i^2 - n_0^2)/2n_i^2$$

where $\Delta$ % is the maximum (or minimum in the case of a moat) refractive index of the index profile segment measured relative to the refractive index of the clad layer.

Alpha-profile—The term alpha-profile refers to a refractive index profile of the central core expressed in terms of $\Delta(b)$ % where b is the radius, and which follows the equation:

$$\Delta(b) \% = \{\Delta b_0 (1 - [|b-b_0|/(b_1-b_0)]^{\alpha})\} \times 100,$$

where $b_0$ is the maximum point of the profile of the core and $b_1$ is the point at which $\Delta(b)$ % is zero and b is the range of $b_i$ less than or equal to b less than or equal to $b_f$, where $\Delta$ % is defined above, $b_i$ is the initial point of the alpha-profile, $b_f$ is the final point of the alpha-profile, and alpha is an exponent which is a real number.

Pin array macro-bending test—This test is used to test compare relative resistance of optical fibers to macro-bending. To perform this test, attenuation loss is measured at 1550 nm when the optical fiber is arranged such that no induced bending loss occurs. This optical fiber is then woven about the pin array and attenuation again measured at the same wavelength. The loss induced by bending is the difference between the two attenuation measurements (in dB). The pin array is a set of ten cylindrical pins arranged in a single row and held in a fixed vertical position on a flat surface. The pin spacing is 5 mm, center-to-center. The pin diameter is 0.67 mm. The optical fiber is caused to pass on opposite sides of adjacent pins. During testing, the optical fiber is placed under enough tension sufficient to make to the optical fiber conform to a portion of the periphery of the pins.

Lateral load test—The lateral load test provides a measure of the micro-bending resistance of the optical fiber. In this test, a prescribed length of optical fiber is placed between two flat plates. A No. 70 wire mesh is attached to one of the plates. The known length of optical fiber is sandwiched between the plates and the reference attenuation is measured while the plates are pressed together with a force of 30 newtons. A 70 newton force is then applied to the plates and the increase in attenuation and dB/m is measured. This increase in attenuation is the lateral load attenuation (dB/m) of the optical fiber.

According to embodiments of the invention, a dispersion compensating optical fiber is provided which has a refractive index profile with a central core segment having a positive relative refractive index ($\Delta_1$) and a core outer radius ($r_1$), a moat segment surrounding the central core segment having negative relative refractive index ($\Delta_2$) and a moat outer radius ($r_2$), and a ring segment surrounding the moat segment having a positive relative refractive index ($\Delta_3$), a ring center radius ($r_3$) to a center of the ring segment, a ring width ($W_r$) measured at half the height of the relative refractive index of the moat segment ($\Delta_3$) wherein the ring segment is offset from the moat outer radius ($r_2$) by a ring offset ($X_o$) greater than 0.4 µm wherein $X_o = r_3 - r_2 - Wr/2$. The refractive index profile of the dispersion compensating fiber according to the invention results in a total dispersion of less than −120 ps/nm/km and greater than −145 ps/nm/km at 1550 nm, and a dispersion slope of less than −0.36 and greater than −0.56 ps/nm²/km at 1550 nm.

In accordance with further embodiments of the invention, the dispersion compensating fiber preferably includes a kappa, defined as the total dispersion at 1550 nm divided by the total dispersion slope at 1550 nm, of between about 240 to 335 nm; more preferably 250 and 320 nm; and more preferably yet between about 275 and 300 nm. The dispersion compensating optical fiber in accordance with embodiments of the invention, also includes a Figure Of Merit (FOM), defined as the absolute value of total dispersion at 1550 nm divided by attenuation at 1550 nm, of preferably greater than 240 ps/nm/dB; more preferably greater than 260 ps/nm/dB; more preferably yet greater than 275 ps/nm/dB; and in some embodiments, greater than 300 ps/nm/dB.

According to other embodiments of the invention, the dispersion compensating optical fiber described herein is preferably included in an optical transmission system and is optically coupled to a standard single mode transmission fiber having a total dispersion between about 14 and 21 ps/nm/km at 1550 nm wherein for all wavelengths within a transmission wavelength band between 1525 nm to 1570 nm, the optical transmission system exhibits a residual dispersion of less than ±15 ps/nm per 100 km of the standard single mode transmission fiber; more preferably less than ±10 ps/nm per 100 km of the standard single mode transmission fiber; and for some embodiments, less than ±6 ps/nm per 100 km of the standard single mode transmission fiber. The dispersion compensating fiber in accordance with the invention is preferably included in a dispersion compensating module.

In accordance with further embodiments of the invention, a dispersion compensating optical fiber preferably comprises a refractive index profile having a central core segment with a relative refractive index ($\Delta_1$) between 2.1% and 1.5% and an outer radius ($r_1$) of between 1.4 and 1.9 µm, a moat segment surrounding the central core segment with a relative refractive index ($\Delta_2$) of between −0.3 and −0.5% and a moat outer radius ($r_2$) between 3.9 and 5.3 µm, and a ring segment surrounding the moat segment with a relative refractive index ($\Delta_3$) of between 0.24 and 0.54%, a ring radius ($r_3$) to a center of the ring segment of between 5.5 and 7.7 µm, a ring width ($W_r$) measured at one-half the relative refractive index ($\Delta_3$) of the central core segment wherein the ring segment is offset from the moat outer radius ($r_2$) by a ring offset ($X_o$) greater than 0.4 µm wherein $X_o = r_3 - r_2 - Wr/2$, and the refractive index profile results in a total dispersion of less than −120 ps/nm/km and greater than −145 ps/nm/km at a wavelength of 1550 nm, a total dispersion slope of less than −0.40 and greater than −0.55 ps/nm²/km at a wavelength of 1550 nm; and a kappa, defined as the total dispersion at 1550 nm divided by the dispersion slope at 1550 nm, of between 250 and 320 nm.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the present preferred embodiment(s) of the invention, examples of which are illustrated in the accompanying drawings and tables. Whenever possible, the same reference numerals will be used throughout the drawings to refer to the same or like parts.

A family of the dispersion compensating optical waveguide fibers in accordance with the present invention is shown and described with reference to FIGS. 1, 4–8, and 13–14 and designated generally throughout by the reference numeral 20. The dispersion compensating fibers 20 described and disclosed herein have a generally segmented core structure. Each of the segments (e.g., the central core, moat, and ring) are described and defined by a refractive index profile, a relative refractive index percent, $\Delta_1$, $\Delta_2$, $\Delta_3$, and representative radii, $r_1$, $r_2$, $r_3$, the ring width, Wr, and ring offset, Xo. Radii for the various segments are all measured from the optical fiber's longitudinal axis center line CL.

Referring now to FIGS. 1, and 4–8, the dispersion compensating fibers 20 according to the invention include a physical core 21 and a clad layer 30 surrounding the core; the clad layer 30 surrounding the core and having a refractive index of $n_c$. According to the invention, the segmented core 21 of the family of dispersion compensating fibers 20 herein further includes a central core segment 22 closest to the fiber's centerline and having an outer radius, $r_1$, and an alpha profile; a moat segment 24 surrounding and contacting the central core segment 22 and having an outer radius, $r_2$; and an annular ring segment 26 surrounding and contacting the moat segment 24 and having a center radius $r_3$, a half height width, Wr, and an offset dimension Xo. Annular clad layer 30, which is preferably un-doped silica, surrounds and abuts the ring segment 26. Clad layer 30 preferably has an outer radius of about 62.5 microns (although various refractive index plots are shown truncated at about 10 microns for clarity). The outermost glass portion of the fibers 20 are preferably covered with a protective UV curable polymer coating 34 to an outside diameter of about 250 μm. The coating 34 is preferably a two-modulus acrylate coating having a softer-modulus inner primary coating and a harder-modulus secondary outer coating, as is conventional.

Figure 4:
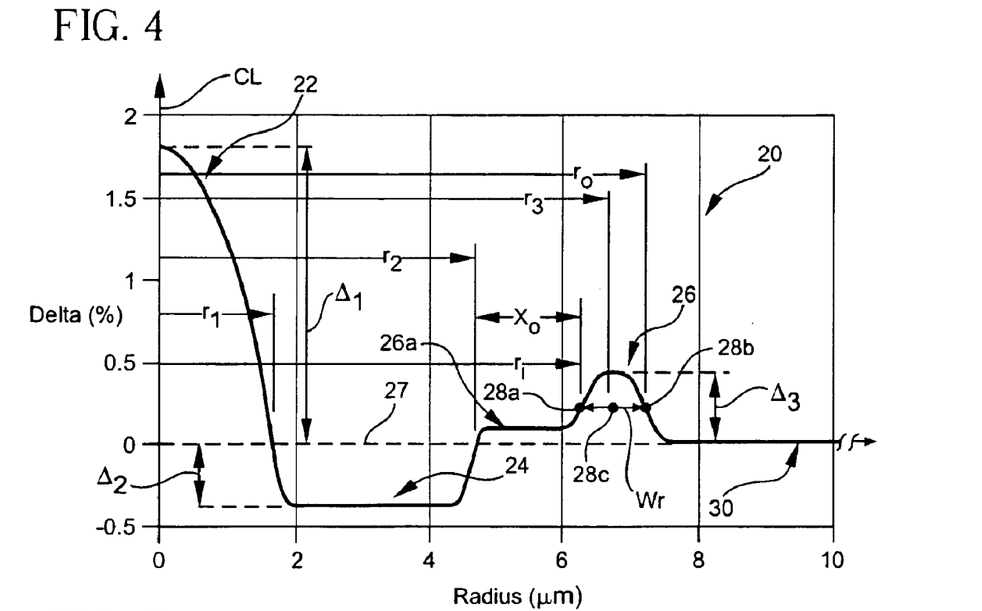
FIG. 4 is a plot of a refractive index profile (Delta % vs. Radius (µm)) of a first embodiment of dispersion compensating fiber in accordance with the invention.

A relative refractive index profile for a first embodiment of dispersion compensating fiber 20 according to the invention is illustrated in FIG. 4. Variations of the profile of FIG. 4 are shown and help describe the family of fibers claimed herein. FIG. 4 shows relative refractive index (in percent) charted versus the dispersion compensating fiber radius (in microns). Further, FIG. 4 illustrates the conventions used throughout for the deltas, $\Delta_1$, $\Delta_2$, $\Delta_3$, representative radii, $r_1$, $r_2$, $r_3$, $r_o$, $r_i$, ring width, Wr, and offset, Xo. The same conventions are used to characterize the relative refractive index profiles for example b–e shown in FIGS. 5–8, examples f–j shown in FIGS. 15–19, and examples 1 and 2 of FIGS. 13–14, and will not be repeated therein for clarity.

The central core segment 22 of family of dispersion compensating fibers 20 has a relative refractive index percent, $\Delta_1$%, of preferably less than 3.0% and greater than 1.0%; more preferably less than 2.1% and greater than 1.5%; more preferably yet less than 2.0% and greater than 1.7%; and most preferably of within the range of from about 1.7% and 1.9%. Further, the central core has an alpha profile with an alpha, α, of less than 5.0; more preferably less than 3.0; and most preferably about 2.0. Additionally, central core segment 22 exhibits an outer radius, $r_1$, preferably between 1.4 and 1.9 μm; more preferably within the range of from about 1.50 and 1.8 μm; and most preferably in the range between 1.61 and 1.71 μm. Outer radius, $r_1$, of the central core segment 22 is measured to, and defined by, the intersection of the descending leg of the refractive index profile of the central core segment 22 with the horizontal axis extension 27 corresponding to, and extending from, the index of the cladding layer 30, which is preferably constructed of pure silica. The refractive index profile of the central core segment 22 is preferably formed by doping pure silica with a sufficient amount of germania such that its index of refraction is raised and, therefore, provides the desired $\Delta_1$% and alpha.

An annular moat segment 24 of dispersion compensating fiber 20 surrounds, and is in contact with, the central core segment 22 and has a negative minimum relative refractive index percent, $\Delta_2$%, preferably more negative than −0.3%; and more preferably within the range from about −0.30% to −0.50%. Further, the moat segment 24 has a width, defined as $r_2-r_1$, of between about 2.4 to about 3.5 μm. Outer radius, $r_2$, of moat segment 24 is measured to the intersection of the moat segment 24 and the ring segment 26. In particular, the outer radius, $r_2$, is measure to, and defined by, the intersection of the ascending outer leg of the profile of the moat segment 24 with the horizontal axis 27 corresponding to the refractive index of the cladding layer 30 (preferably pure silica). The outer radius $r_2$ of the moat is preferably located between about 3.9 and 5.3 μm; more preferably between 4.4 and 4.9 μm from the fiber's centerline. Moat segment 24 is preferably formed by doping silica with fluorine in an amount sufficient to reduce the refractive index thereof relative to the cladding 30 in the amount to achieve the desired relative refractive index of the moat segment, $\Delta_2$%. Accordingly other suitable glass modifiers which lower the refractive index may also be employed.

Surrounding the moat segment 24 is annular ring segment 26 of the dispersion compensating fiber 20. The raised-index ring 26 preferably has a relative refractive index percent, $\Delta_3$%, of between about 0.20 and 0.60%; more preferably of within the range of from about 0.24% and 0.54%. Ring segment 26 has a half-height width, Wr, preferably within the range of from about 0.8 μm to about 2.2 μm, measured from side point to side point. The half height width, Wr, has a center point radius, r3, measured from the fiber centerline to the bisection point, 28c, of width, Wr, of preferably between about 5.5 μm to about 7.7 μm; more preferably 6.1 to 7.0 μm. The ring width, Wr, is equal to $r_o-r_i$, where $r_o$ is the dimension from the centerline, CL, to the half height point 28b, and, likewise, $r_i$ is the dimension from the fiber centerline, CL, to the half height point 28a. The half height points, 28a, 28b, are measured at, and defined as, the points on the ascending and descending legs of the ring segment 26 where the delta value equals one-half of $\Delta_3$%. The ring segment 26 is preferably formed by doping with germania sufficient to up-dope the ring relative to the clad layer 30 the desired amount to provide the desired ring profile and relative refractive index, $\Delta_3$%. According to the invention, the ring segment 26 (defined by the location of Wr) is offset from the edge of the moat segment 24 by a distance Xo. The offset dimension, Xo, for the dispersion compensation fiber 20 is defined by the relationship:

$$Xo = r_3 - r_2 - Wr/2.$$

Figure 5:
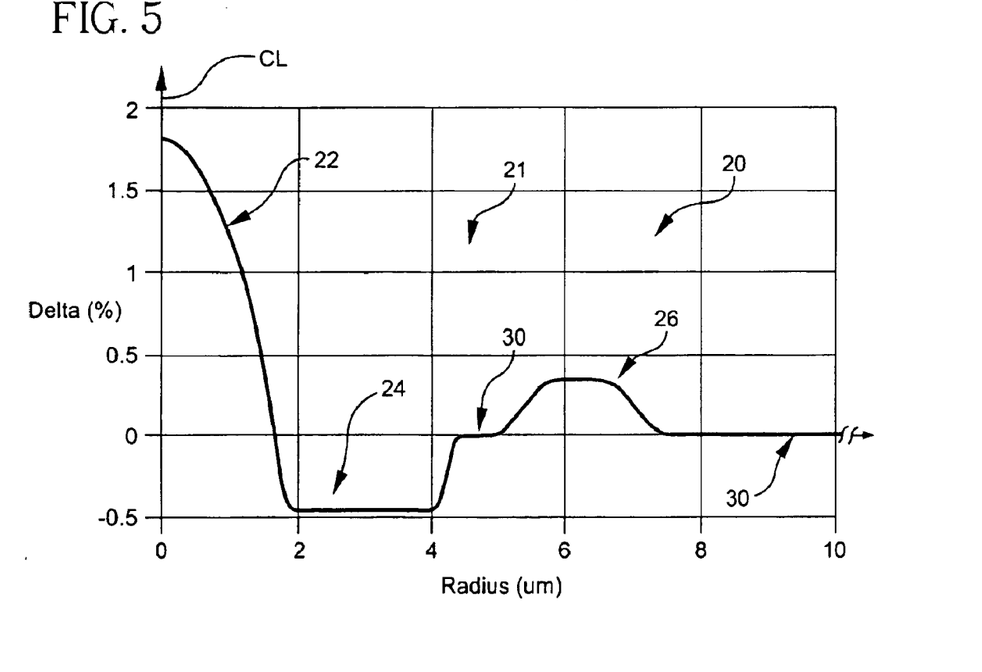
FIGS. 5–8 are plots of alternative refractive index profiles for several embodiments (examples b–e) of the dispersion compensating fiber in accordance with the invention.
Figure 6:
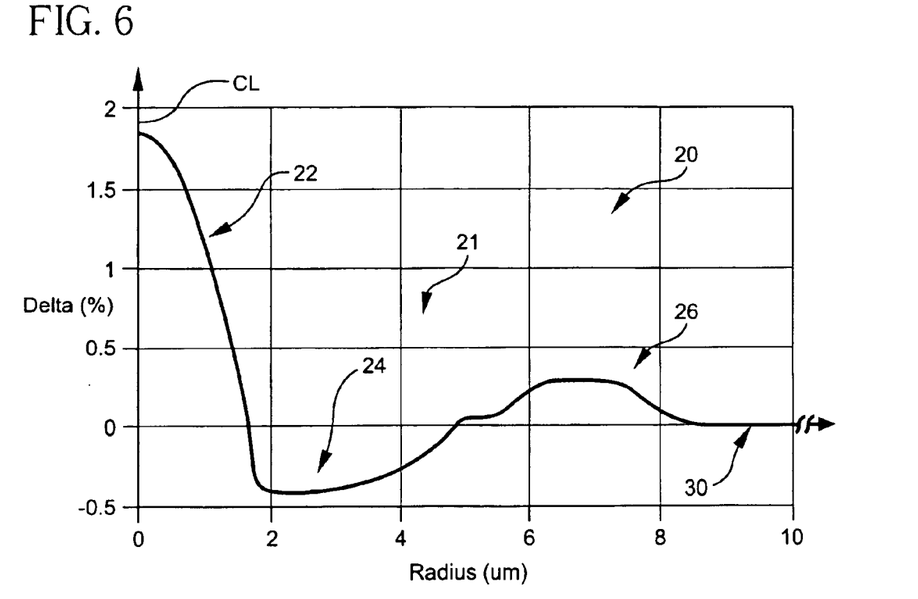
Figure 7:
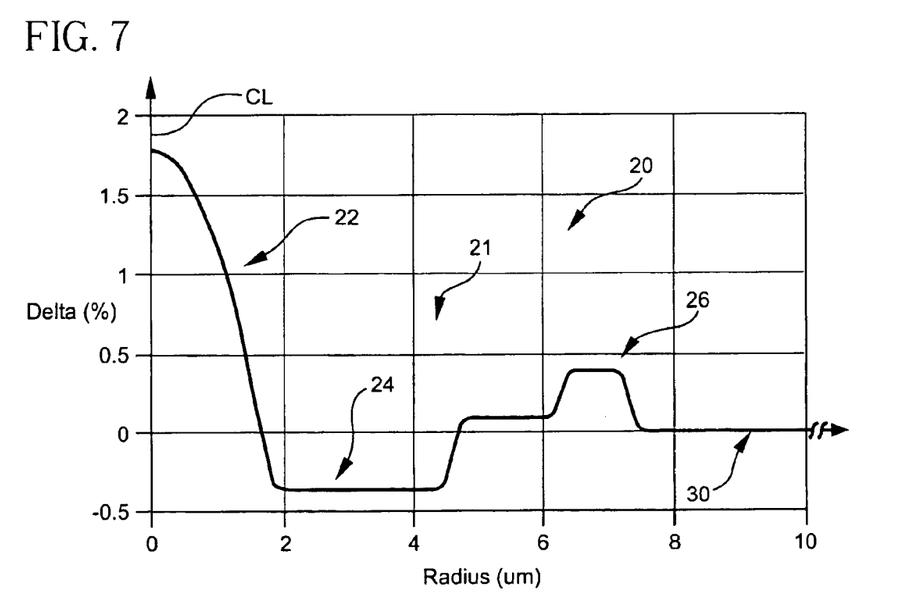
Figure 8:
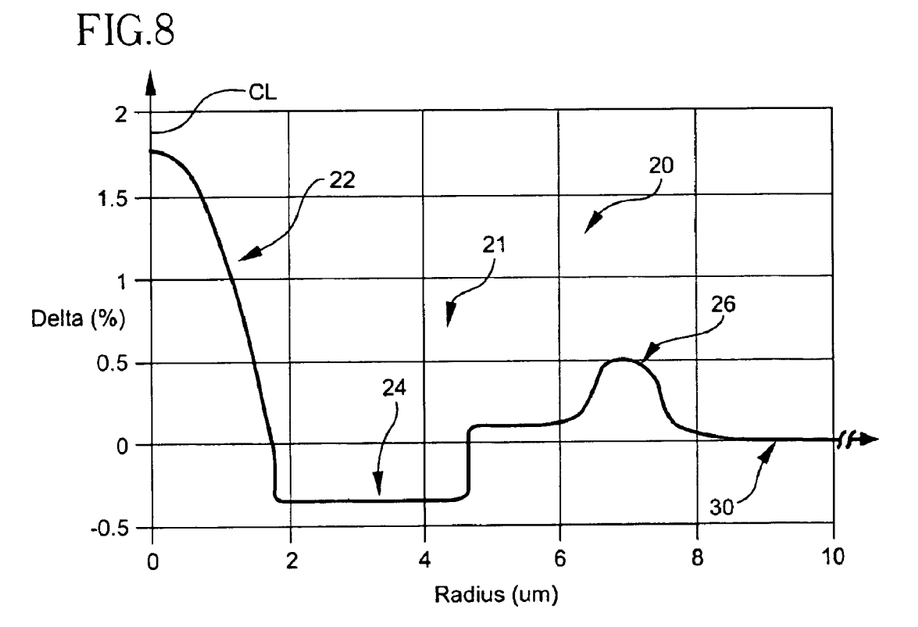

The offset of the ring, Xo, from the edge of the moat segment 24 is preferably greater than 0.4 μm; more preferably greater than 0.75 μm; more preferably yet greater than 0.9 μm; and most preferably between 0.75 and 2.0 μm. In some embodiments, inward toward the center of the fiber, the ring segment 24 may include a portion 26a having a delta % raised slightly above the level of cladding 30; typically on the order of between 0.05 and 0.2%. Optionally, as shown in FIG. 5, the portion 26a may be of approximately the same index as the clad layer 30.

The clad layer 30 surrounds and abuts the ring segment 26 and has a relative refractive index percent $\Delta_c$% of approximately 0%, and an outer radius of about 62.5 μm. The clad layer 30 is preferably manufactured from pure, undoped, silica glass. However, it should be understood that the clad layer 30 may be slightly up or down-doped as well provided that the relative refractive index profile described herein is achieved.

Various embodiments of dispersion compensating fiber 20 are described herein in accordance with the invention and each preferably has a core/moat ratio, defined as the central core radius, $r_1$, divided by the outer moat radius, $r_2$, of less than 0.4. More preferably, the core/moat ratio is less than 0.39; and most preferably between about 0.33 and 0.39. Further, the moat/ring ratio of the fiber 20, defined as the outer moat radius, $r_2$, divided by the ring center radius, $r_3$, is preferably between about 0.66 and 0.72.

Moreover, the dispersion compensating fiber 20 according to embodiments of the present invention described herein exhibits desired optical properties at a wavelength of about 1550 nm adapted to allow excellent dispersion compensation of accumulated dispersion when used in a system with a standard single mode optical fiber. Dispersion compensating fiber 20 in accordance with embodiments described herein preferably has total dispersion of less than −120 ps/nm/km and greater than −145 ps/nm/km; more preferably less than −120 ps/nm/km and greater than −132 ps/nm/km at 1550 nm. The total dispersion slope at 1550 nm is preferably less than −0.36 ps/nm²/km; and in some embodiments, less than −0.40 ps/nm²/km; and preferably in the range of less than −0.36 ps/nm²/km and greater than −0.56 ps/nm²/km; more preferably less than −0.40 ps/nm²/km and greater than −0.55 ps/nm²/km; most preferably less than −0.41 ps/nm²/km and greater than −0.47 ps/nm²/km. The preferred kappa, defined as the total dispersion at 1550 nm divided by the total dispersion slope at 1550 nm, for the fiber 20 is preferably greater than about 200 nm; more preferably greater than 240 nm; and more preferably yet between about 240 nm and 335 nm at 1550 nm; with a more preferable range of between 250 and 320 nm at 1550 nm; and most preferably between 275 nm and 300 nm at 1550 nm. The effective area of the fibers 20 are preferably greater than or equal to about 19.0 $\mu m^2$ at 1550 nm; more preferably greater than or equal to about 20.0 $\mu m^2$ at 1550 nm, and the mode field diameter at 1550 nm is preferably greater than 4.8 $\mu m$.

Calculated lateral load bend loss of the fibers 20 at 1550 nm is preferably less than or equal to about 5.0 dB/m, and more preferably of less than or equal to about 3.0 dB/m; and calculated pin array bend loss exhibited by the fibers 20 is less than about 40 dB at 1550 nm, and in some embodiments less than 30 dB at 1550 nm. The dispersion compensating fibers 20 of the present invention further exhibits a preferred theoretical cutoff wavelength of the $LP_{02}$ mode of less than about 1700 nm, and of the $LP_{11}$ mode of less than about 1750 nm.

Table 1 below illustrates the modeled (calculated) optical properties for several examples of dispersion compensating fiber in accordance with embodiments of the invention.

TABLE 1

OPTICAL PROPERTIES FOR DISPERSION COMPENSATING FIBERS

| | EXAMPLE # | | | | |
|---|---|---|---|---|---|
| | a | b | c | d | e |
| TOTAL DISPERSION (ps/nm/km) @ 1550 nm | −124 | −141 | −140 | −125 | −138 |
| DISPERSION SLOPE (ps/nm²/km) @ 1550 nm | −0.46 | −0.51 | −0.50 | −0.42 | −0.47 |
| K (nm) @ 1550 nm | 268 | 279 | 280 | 296 | 294 |
| LATERAL LOAD LOSS @ 1550 NM (dB/m) | 1.72 | 1.61 | 2.41 | 1.71 | 2.49 |
| PIN ARRAY BEND LOSS @ 1550 nm (dB) | 30.3 | 22.0 | 27.3 | 23.9 | 17.3 |
| EFFECTIVE AREA @ 1550 nm ($\mu m^2$) | 21.2 | 21.0 | 22.0 | 21.6 | 22.7 |
| MFD @ 1550 nm ($\mu m$) | 5.11 | 5.02 | 5.15 | 5.15 | 5.21 |
| λcth $LP_{02}$ (nm) | 1581 | 1589 | 1610 | 1598 | 1643 |
| λcth $LP_{11}$ (nm) | 1419 | 1487 | 1556 | 1491 | 1706 |
| Attenuation @ 1550 nm (dB/km) | 0.451 | 0.456 | 0.453 | 0.451 | 0.452 |
| FOM @ 1550 nm (ps/nm/dB) | 275 | 309 | 309 | 277 | 305 |

Table 2 below includes dispersion compensating fiber examples a–e in accordance with embodiments of the invention and further defines the physical structure of the family of refractive index profiles that yield optical properties within desired performance ranges.

TABLE 2

Physical Structure For Example Fibers a–e

| | EXAMPLE # | | | | |
|---|---|---|---|---|---|
| | a | b | c | d | e |
| $\Delta_1$ (%) | 1.83 | 1.83 | 1.83 | 1.83 | 1.78 |
| $r_1$ ($\mu m$) | 1.65 | 1.67 | 1.64 | 1.64 | 1.70 |
| $\Delta_2$ (%) | −0.37 | −0.46 | −0.40 | −0.35 | −0.36 |
| $r_2$ ($\mu m$) | 4.63 | 4.32 | 4.84 | 4.66 | 4.62 |
| Moat Width ($\mu m$) | 2.98 | 2.65 | 3.20 | 3.02 | 2.92 |
| $\Delta_3$ (%) | 0.44 | 0.36 | 0.27 | 0.40 | 0.49 |

TABLE 2-continued

Physical Structure For Example Fibers a–e

| | EXAMPLE # | | | | |
|---|---|---|---|---|---|
| | a | b | c | d | e |
| $r_3$ (μm) | 6.66 | 6.18 | 6.80 | 6.79 | 6.92 |
| $r_i$ (μm) | 6.25 | 5.36 | 5.78 | 6.24 | 6.38 |
| $r_o$ (μm) | 7.16 | 7.00 | 7.82 | 7.33 | 7.46 |
| Wr (μm) | 0.92 | 1.64 | 2.04 | 1.09 | 1.08 |
| Xo (μm) | 1.59 | 1.04 | 0.94 | 1.58 | 1.76 |
| ALPHA | 2.0 | 2.0 | 2.0 | 2.0 | 2.0 |
| CORE-MOAT RATIO | 0.36 | 0.39 | 0.34 | 0.35 | 0.37 |
| MOAT/RING RATIO | 0.70 | 0.70 | 0.71 | 0.69 | 0.67 |

Figure 9:
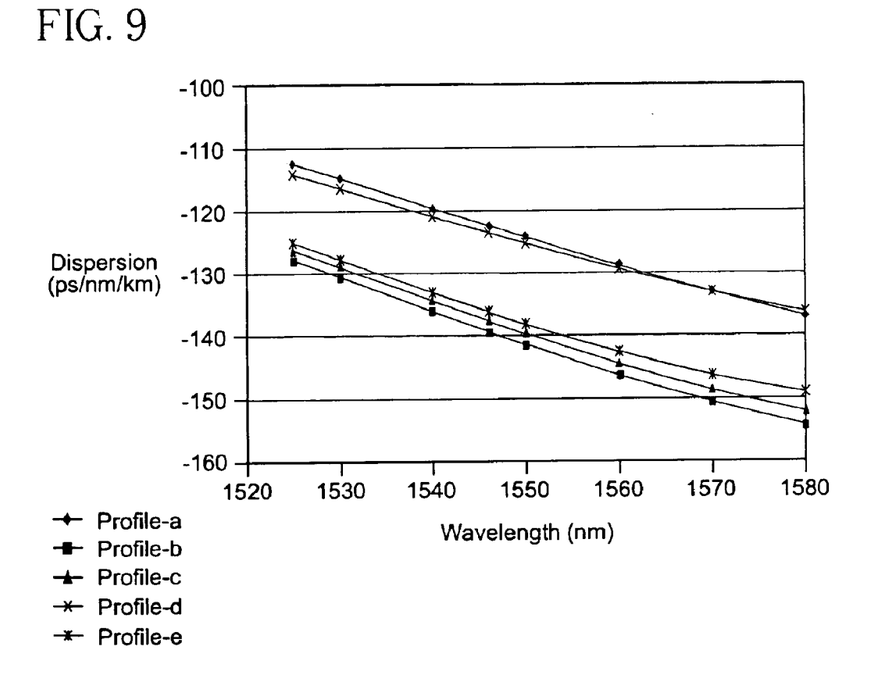
FIG. 9 is a graph of total dispersion (ps/nm/km) versus wavelength (nm) for the dispersion compensating fiber examples a–e according to embodiments of the invention.
Figure 10:
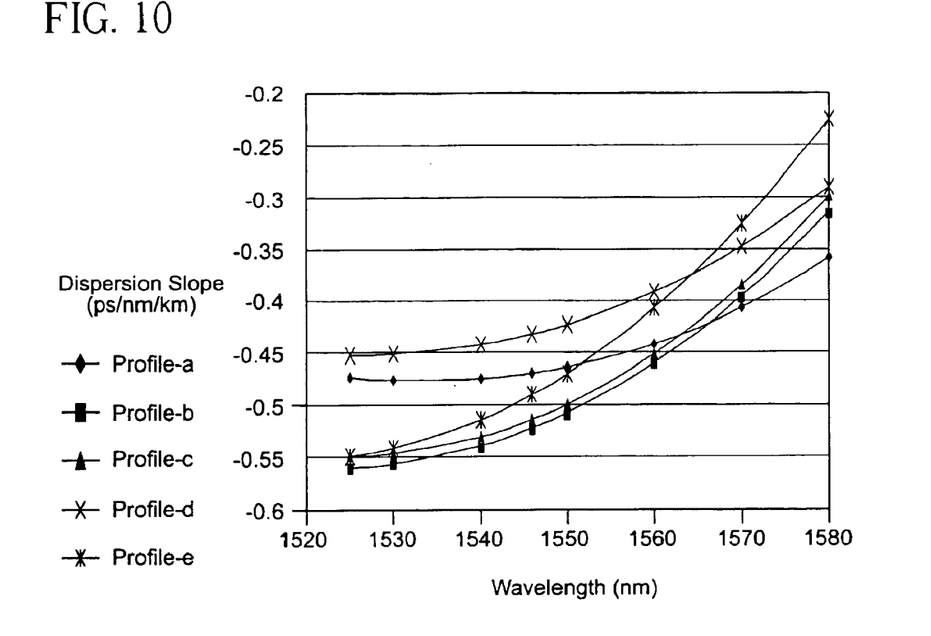
FIG. 10 is a graph of total dispersion slope (ps/nm²/km) versus wavelength (nm) for fiber examples a–e in accordance with embodiments of the invention.
Figure 11:
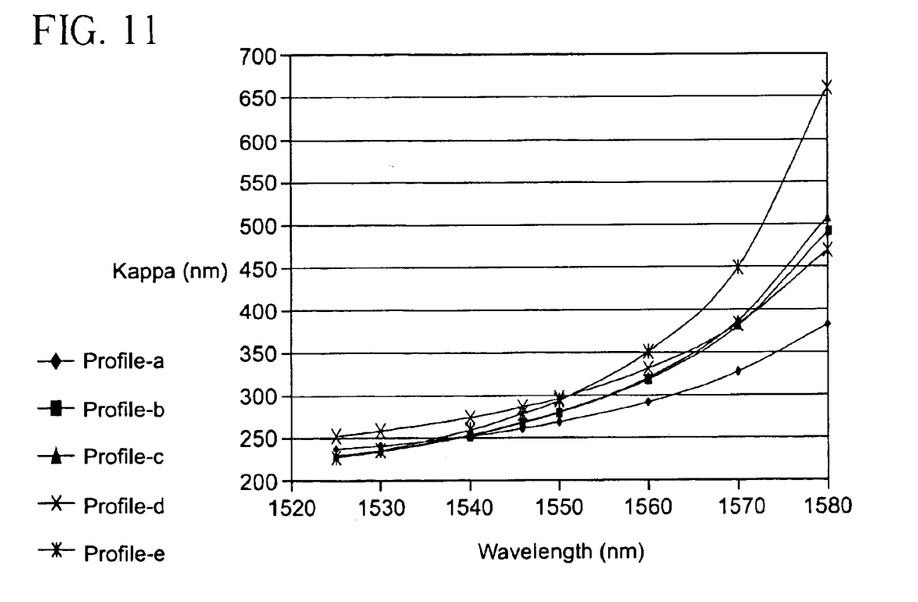
FIG. 11 is a graph of the kappa (nm) versus wavelength (nm) for dispersion compensating fiber examples a–e in accordance with embodiments of the present invention.

FIGS. 9–11 illustrate certain optical parameter plots for the dispersion compensating fiber examples a–e. In particular, the plots include total dispersion across at least the extended C wavelength band from 1525 to 1570 nm (See FIG. 9), total dispersion slope across at least the extended C wavelength band from 1525 to 1570 nm (FIG. 10), and kappa across at least the extended C wavelength band from 1525 to 1570 nm (FIG. 11), respectively, for dispersion compensating fiber examples a–e. The wavelength band from 1525 to 1570 nm is generally referred to as the "extended C band," and is the preferred wavelength band of operation for systems employing the dispersion compensating fiber in accordance with the present invention. However, it should be apparent that the dispersion compensation fiber in accordance with the invention may be used over other wavelength bands, such as the C band (1525 to 1565 nm).

Further examples of the dispersion compensating fiber 20 in accordance with embodiments of the invention are described with reference to Tables 3 and 4 below.

Table 4 below includes dispersion compensating fiber examples f–j (shown in FIGS. 15–19) in accordance with further embodiments of the invention and further defines the physical structure of the family of refractive index profiles that yield optical properties within desired performance ranges. The profile examples f–j (shown in FIGS. 15–19) are described using the conventions shown in the refractive index profile shown in FIG. 4.

TABLE 4

Physical Structure For Example Fibers f–j

| | EXAMPLE # | | | | |
|---|---|---|---|---|---|
| | f | g | h | i | j |
| $\Delta_1$ (%) | 1.82 | 1.82 | 1.82 | 1.92 | 1.72 |
| $r_1$ (μm) | 1.68 | 1.69 | 1.67 | 1.62 | 1.72 |
| $\Delta_2$ (%) | -0.37 | -0.37 | -0.37 | -0.37 | -0.37 |
| $r_2$ (μm) | 4.55 | 4.57 | 4.52 | 4.49 | 4.79 |
| Moat Width (μm) | 2.87 | 2.88 | 2.85 | 2.87 | 3.08 |
| $\Delta_3$ (%) | 0.44 | 0.44 | 0.44 | 0.43 | 0.46 |
| $r_3$ (μm) | 6.71 | 6.78 | 6.67 | 6.58 | 7.00 |
| $r_i$ (μm) | 6.23 | 6.26 | 6.19 | 6.09 | 6.48 |
| $r_o$ (μm) | 7.21 | 7.27 | 7.18 | 7.04 | 7.50 |
| Wr (μm) | 0.98 | 1.01 | 0.99 | 0.95 | 1.02 |
| Xo (μm) | 1.67 | 1.71 | 1.66 | 1.61 | 1.70 |
| ALPHA (α) | 2.0 | 2.0 | 2.0 | 2.0 | 2.0 |
| CORE-MOAT RATIO | 0.37 | 0.37 | 0.37 | 0.36 | 0.36 |
| MOAT/RING RATIO | 0.68 | 0.67 | 0.68 | 0.68 | 0.68 |

EXPERIMENTAL EXAMPLES

Figure 13:
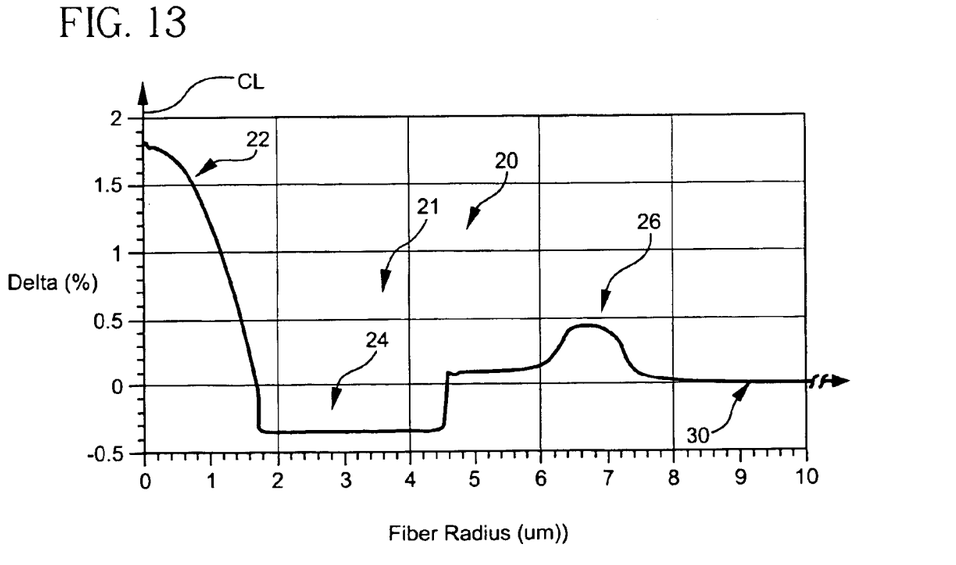
FIGS. 13–14 are refractive index plots of Delta % versus Radius (µm) for experimental fiber examples 1 and 2 in accordance with embodiments of the present invention.
Figure 14:
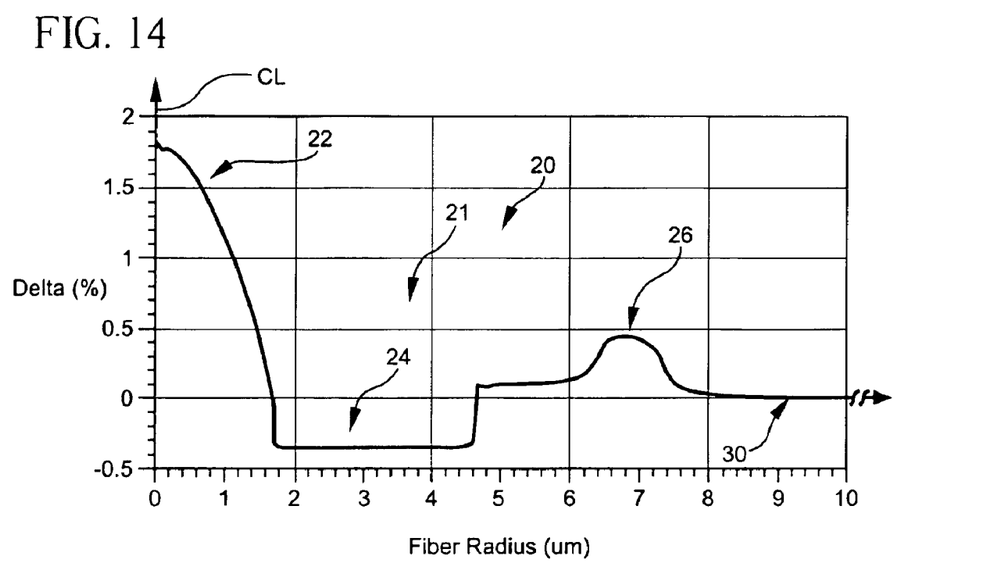
Figure 15:
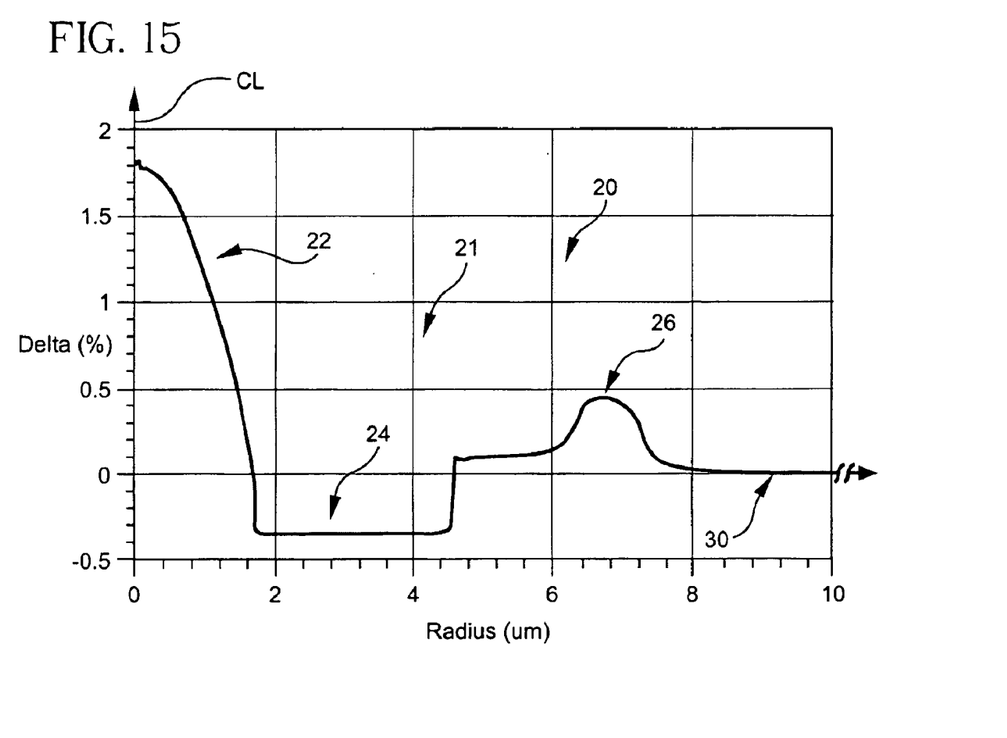
FIGS. 15–19 are plots of alternative refractive index profiles for several embodiments (examples f–j) of the dispersion compensating fiber in accordance with the present invention.
Figure 16:
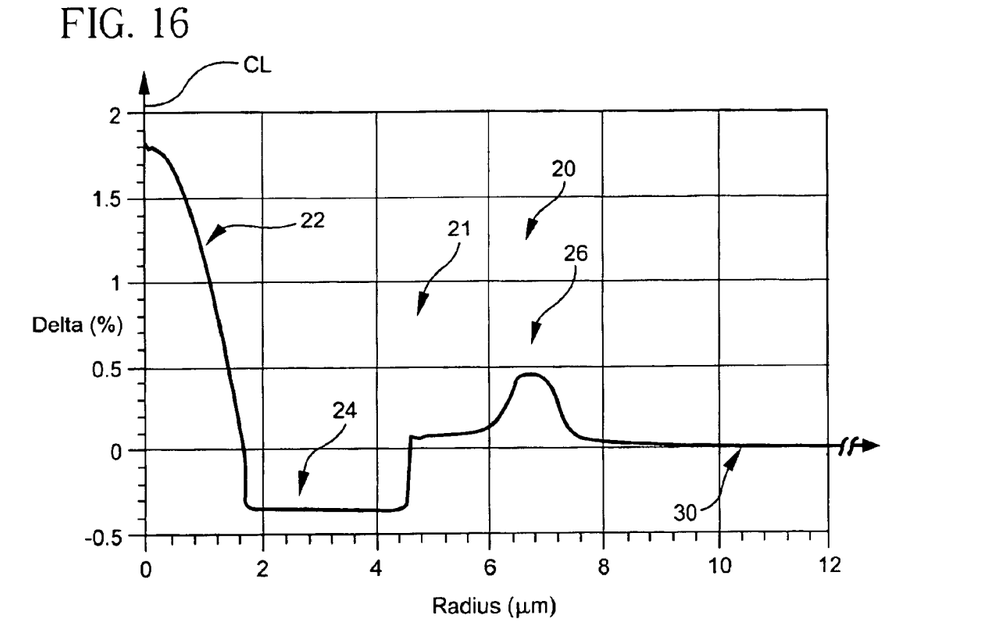
Figure 17:
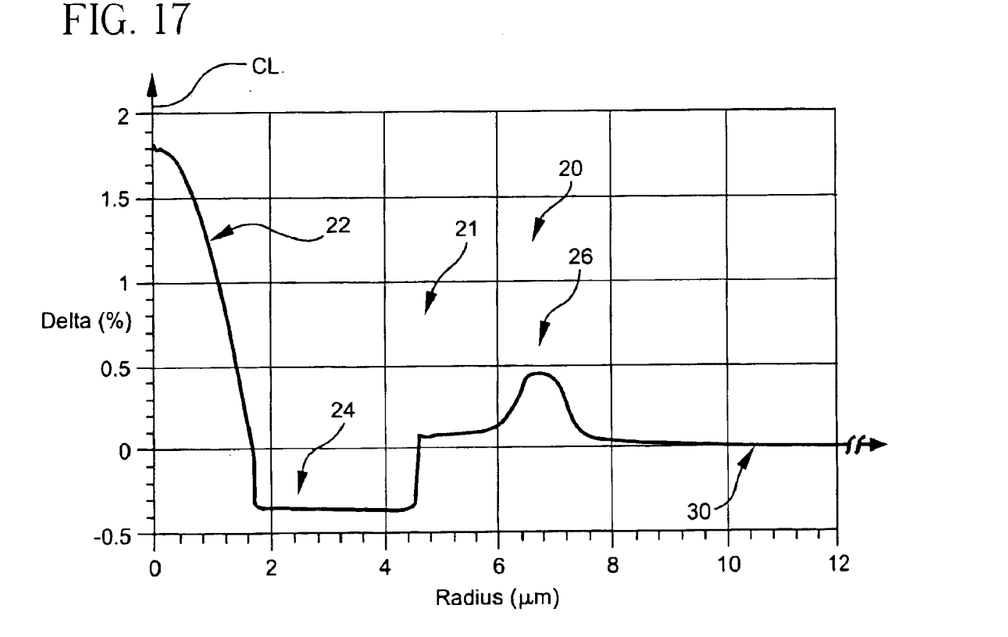
Figure 18:
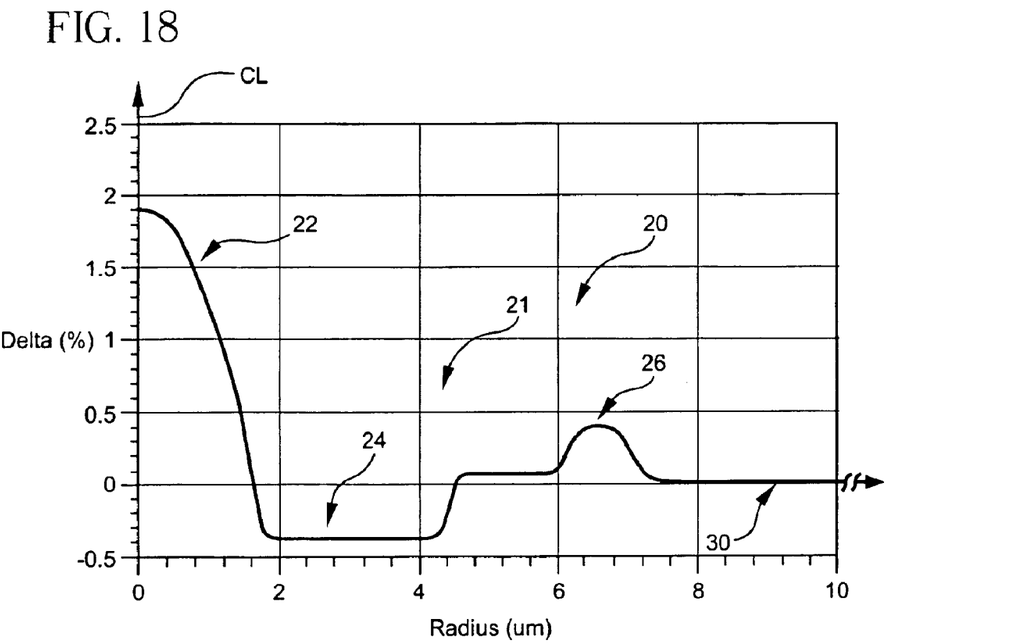
Figure 19:
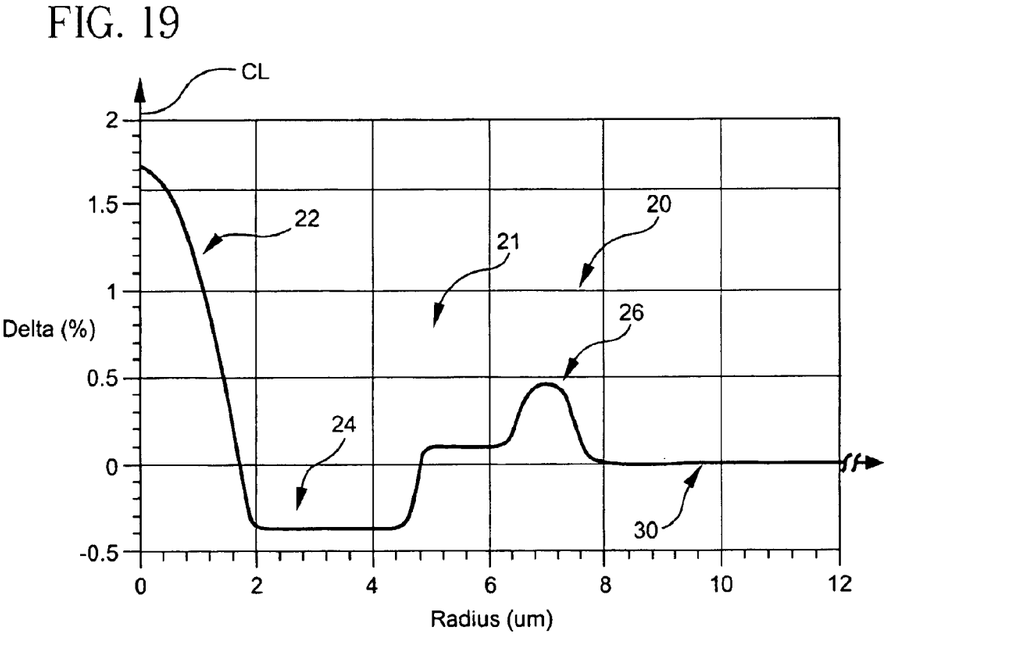

Several examples of the dispersion compensating fiber 20 in accordance with the invention were actually manufactured and tested. Optical properties of experimental Examples 1 and 2 are illustrated in Table 5 below; the profiles of which are shown in FIGS. 13 and 14, respectively.

TABLE 3

OPTICAL PROPERTIES FOR DISPERSION COMPENSATING FIBERS

| | EXAMPLE # | | | | |
|---|---|---|---|---|---|
| | f | g | h | i | j |
| TOTAL DISPERSION (ps/nm/km) @ 1550 nm | -126 | -121 | -131 | -121 | -125 |
| DISPERSION SLOPE (ps/nm²/km) @ 1550 nm | -0.44 | -0.45 | -0.41 | -0.40 | -0.50 |
| K (nm) @ 1550 nm | 288 | 262 | 318 | 291 | 250 |
| LATERAL LOAD LOSS @ 1550 NM (dB/m) | 1.53 | 1.26 | 1.93 | 0.83 | 2.74 |
| PIN ARRAY BEND LOSS @ 1550 nm (dB) | 18.7 | 15.3 | 23.7 | 14.9 | 33.0 |
| EFFECTIVE AREA @ 1550 nm (μm²) | 21.3 | 20.6 | 22.1 | 19.8 | 22.6 |
| MFD @ 1550 nm (μm) | 5.14 | 5.06 | 5.18 | 4.96 | 5.24 |
| λc $LP_{02}$ (nm) | 1613 | 1621 | 1604 | 1584 | 1610 |
| λc $LP_{11}$ (nm) | 1537 | 1545 | 1528 | 1413 | 1540 |
| Attenuation @ 1550 nm (dB/km) | 0.452 | 0.452 | 0.453 | 0.453 | 0.448 |
| FOM @ 1550 nm (ps/nm/dB) | 278 | 268 | 290 | 267 | 278 |

TABLE 5

Experimental Examples

| | Ex. 1 | Ex. 2 |
|---|---|---|
| | FIG. # | |
| | FIG. 13 | FIG. 14 |
| Dispersion @ 1550 nm (ps/nm/km) | −123.3 | −128.8 |
| Dispersion Slope @ 1550 nm (ps/nm$^2$/km) | −0.420 | −0.476 |
| Kappa @ 1550 nm (nm) | 293 | 271 |
| Mode Field Diameter @ 1550 nm ($\mu m^2$) | 5.15 | 5.17 |
| Pin Array @ 1550 nm (dB) - predicted | 17.7 | 27.7 |
| Lateral Load @ 1550 nm (dB/m) - predicted | 1.45 | 2.32 |
| Attenuation @ 1550 nm (dB/km) | 0.406 | 0.422 |
| FOM @ 1550 nm | 304 | 305 |

Figure 1:
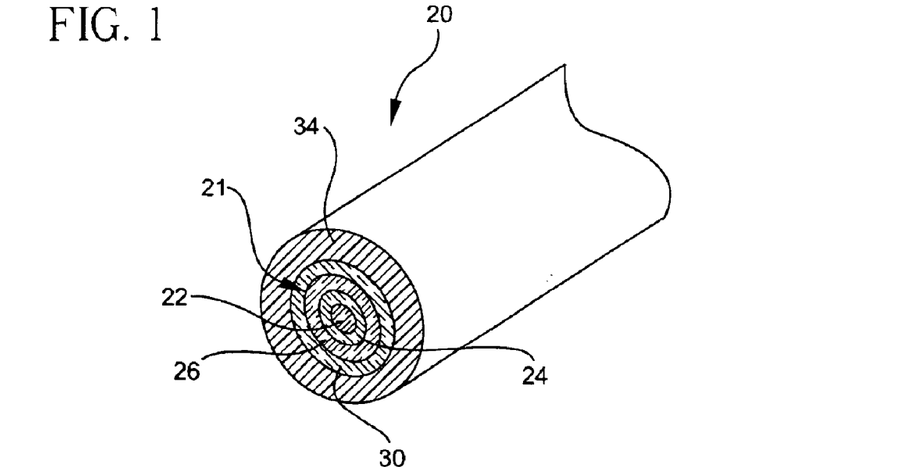
FIG. 1 is a partial cross-sectional isometric view of a dispersion compensating fiber in accordance with embodiments of the present invention.
Figure 2:
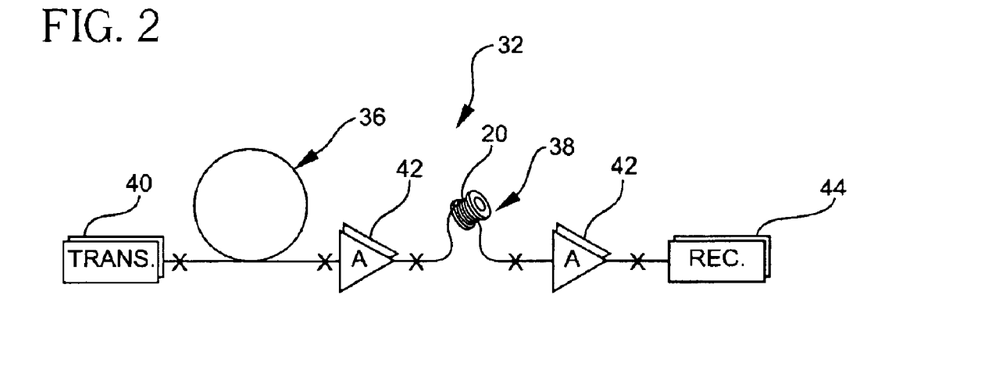
FIGS. 2 and 3 are schematic diagrams of optical transmission systems employing the dispersion compensating fiber in accordance with embodiments of the invention.
Figure 3:
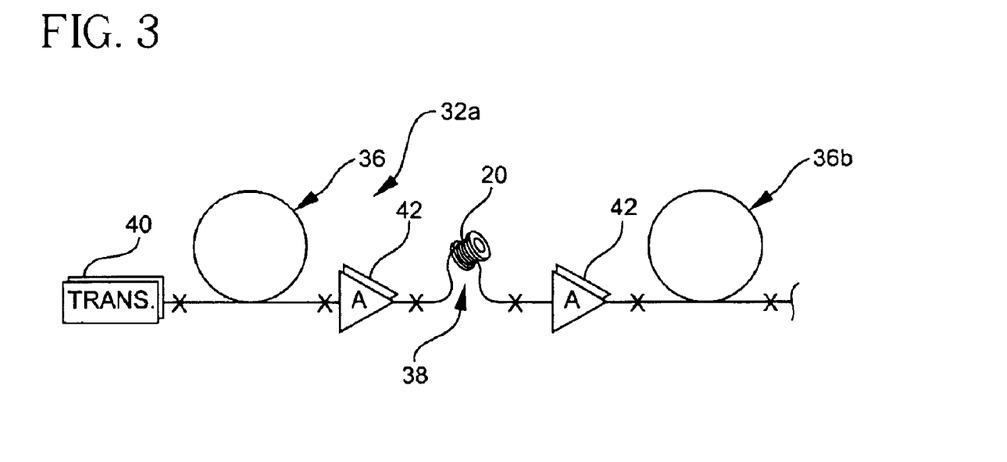

FIGS. 2 and 3 illustrate optical transmission systems 32, 32a employing the dispersion compensating fiber 20 according to the embodiments of the invention described herein. The systems 32, 32a include an optical signal transmitter 40, and a transmission fiber 36 optically coupled to, and in optical communication with, the transmitter 40. The transmission fiber 36 is preferably a standard single mode fiber, such as, for example, SMF-28®, available from Corning Incorporated of Corning, N.Y. The standard single mode transmission fiber 36 has a positive total dispersion and positive total dispersion slope at 1550 nm, for example. In particular, the transmission fiber 36 utilized in the systems 32, 32a preferably have total dispersion at 1550 nm of between about 14 and 21 ps/nm/km (nominally about 16.7 ps/nm/km at 1550 nm). The dispersion slope of the transmission fiber 36 in the systems 32, 32a is preferably between about 0.044 and 0.067 ps/nm$^2$/km (nominally about 0.06 ps/nm$^2$/km); and kappa at 1550 nm is preferably between about 250 and 350 nm (nominally about 278 nm). The transmission fiber 36 preferably has a step index profile with a zero dispersion wavelength, $\lambda_0$, between about 1300 and 1325 nm, a core delta % of between about 0.34% and 0.38% and an effective area at 1550 nm of greater than about 70 $\mu m^2$.

The dispersion compensating fiber 20 is optically coupled to the transmission fiber 36 and also, preferably, to one or more amplifiers (or amplifier stages) 42, and is selected such that the total negative dispersion generated by the dispersion compensating fiber 20 is of a sufficient amount to substantially compensate for the accumulated dispersion of the span of transmission fiber 36. By the term "substantially compensate" what is meant is that the dispersion compensation is of such a magnitude that the dispersion at the end of the length of dispersion compensating fiber 20 (and at the end of the span including the length of transmission fiber 36) is made to be approximately zero. "Substantially compensate" also includes conditions where the dispersion of the span is intentionally slightly (by as much as 5 percent) under or over compensated for, for example at any wavelength within the operating wavelength band. FIG. 2 illustrates a single fiber span (including the transmission fiber 36 and dispersion compensating fiber 20) connected to and optically coupled between a transmitter 40 and receiver 44. In contrast, the system 32a includes coupling to a repeater 42 and another length of transmission fiber 36b, such that the system includes multiple spans. The transmission systems may also include other conventional optical components such as connectors, couplers, etc.

In accordance with the invention, the dispersion compensating fiber 20 may be included in a dispersion compensating module 38 by winding the fiber onto a spool or reel and/or otherwise packaging the fiber in an enclosure. Optionally, the dispersion compensating fiber 20 may be cabled, serially coupled to the transmission and laid out lengthwise (as opposed to winding on a spool) and, therefore, may contribute to the overall span length. As shown in FIGS. 2 and 3, the Xs connote splices or connectors optically coupling the respective system components.

As should be recognized, the more negative dispersion of the dispersion compensating fiber 20 in accordance with the invention allows for the use of shorter lengths of dispersion compensating fiber to compensate for the dispersion accumulated in the length of transmission fiber 36. This has the further advantage of increasing the Figure Of Merit, FOM, of the fiber as the attenuation penalty for having more negative dispersion is small. The FOM, defined as the absolute value of total dispersion at 1550 nm divided by attenuation at 1550 nm, for the family of dispersion compensating fibers 20 in accordance with the invention preferably has an absolute value greater than about 240 ps/nm/dB at 1550 nm; more preferably greater than 260 ps/nm/dB; more preferably yet greater than 275 ps/nm/dB at 1550 nm; and in some embodiments greater than about 300 ps/nm/dB at 1550 nm. Likewise, the higher dispersion value allows for a reduction in IL when the dispersion compensating fiber is included in a dispersion compensating module. Accordingly, the cost and size of the module is advantageously reduced, as is the overall system attenuation.

By way of example, a length of about 10–15 km of the dispersion compensating fiber 20 in accordance with the invention may compensate for the built up dispersion of 100 km of the transmission fiber 36 described above. In addition, the residual dispersion amplitudes for such a system over a desired operating wavelength band (1525 to 1570 nm) is less than +/−15 ps/nm per 100 km of the transmission fiber 36; and less than +/−10 ps/nm per 100 km of the transmission fiber 36 for some of the embodiments described herein. Table 6 below illustrates the system residual dispersion amplitude over the wavelength band from 1525 to 1570 nm. As should be apparent, the dispersion compensating fibers 20 in accordance with the invention have utility for minimizing system residual dispersion over the operating wavelength band (at least 1525–1565 nm).

TABLE 6

System Residual Dispersion with Fiber Ex. a–e

| PARAMETER | $L_{TRANS}$ (km) | $L_{DCF}$ (km) | +/−RESIDUAL DISPERSION (1525–1570 NM) (ps/nm per 100 km) |
|---|---|---|---|
| Ex. a | 100 | 13.46 | +/−6 |
| Ex. b | 100 | 11.85 | +/−5 |
| Ex. c | 100 | 12.00 | +/−5 |

TABLE 6-continued

System Residual Dispersion with Fiber Ex. a–e

| PARAMETER | $L_{TRANS}$ (km) | $L_{DCF}$ (km) | +/−RESIDUAL DISPERSION (1525–1570 NM) (ps/nm per 100 km) |
|---|---|---|---|
| Ex. d | 100 | 13.35 | +/−8 |
| Ex. e | 100 | 12.14 | +/−9 |

Figure 12:
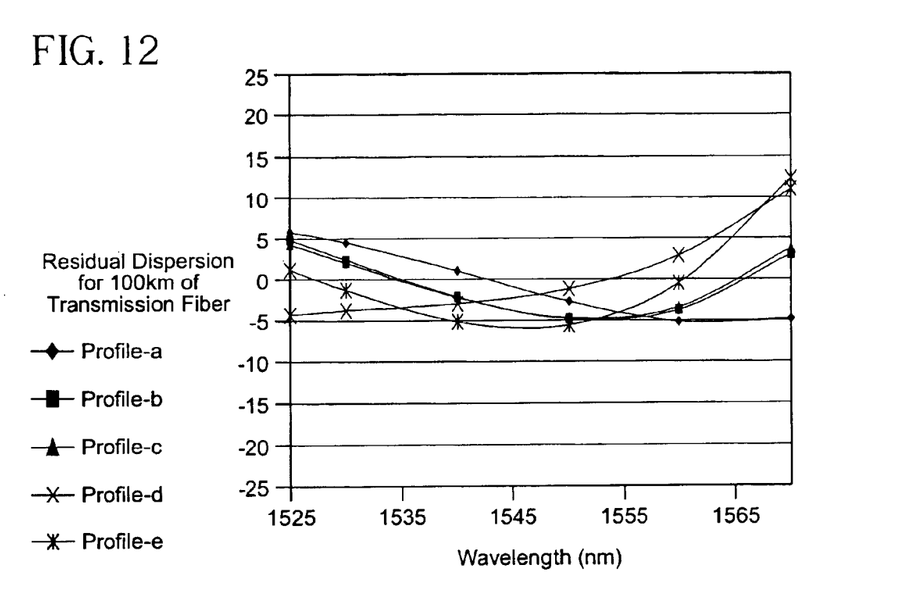
FIG. 12 is a graph of residual dispersion (ps/nm) versus wavelength (nm) for fiber examples a–e according to embodiments of the invention.

FIG. 12 illustrates plots of calculated residual dispersion in ps/nm for a 100 km length of the standard single mode transmission fiber 36 having dispersion at 1550 nm of about 16.7 ps/nm/km and a dispersion slope of about 0.06 ps/nm²/km at 1550 nm optically coupled to the various examples (a–e) of the dispersion compensating fiber 20. As can be seen, the residual dispersion for the system is less than +/−15 ps/km over the wavelength band of between 1525 to 1570 nm for a 100 km length of the standard single mode transmission fiber; and more preferably less than +/−10 ps/km over the wavelength band of between 1525 to 1570 nm. For some of the examples (Ex. a, b, and c), the residual dispersion is less than or equal to +/−6 ps/nm for 100 km of the transmission fiber 36 over the range from 1525 to 1570 nm. Accordingly, it should be recognized that the dispersion compensating fiber in accordance with the invention offers excellent dispersion compensation over the operating wavelength range.

Regarding fabrication methods, the dispersion compensating fiber 20 may be constructed via a variety of methods including, but in no way limited to, vapor axial deposition (VAD), modified chemical vapor deposition (MCVD), plasma chemical vapor deposition (PCVD), and outside vapor deposition (OVD). It will be apparent to those skilled in the art that various modifications and variations can be made to the present invention without departing from the scope of the invention. Thus it is intended that the present invention cover the modifications and variations of this invention provided they come within the scope of the appended claims and their equivalents.

What is claimed is:

1. A dispersion compensating optical fiber, comprising:
    a refractive index profile having
        a central core segment with a positive relative refractive index ($\Delta_1$) and a core outer radius ($r_1$),
        a moat segment surrounding the central core segment having negative relative refractive index ($\Delta_2$) and an moat outer radius ($r_2$), and
        a ring segment surrounding the moat segment having a positive relative refractive index ($\Delta_3$), a ring center radius ($r_3$) to a center of the ring segment, a ring width ($W_r$) measured at half the height of the relative refractive index of the moat segment ($\Delta_3$) wherein the ring segment is offset from the moat outer radius ($r_2$) by a ring offset ($X_o$) greater than 0.4 µm, wherein $X_o = r_3 - r_2 - W_r/2$, and the refractive index profile results in
    dispersion slope of less than −0.36 and greater than −0.56 ps/nm²/km at 1550 nm; and
    total dispersion of less than −120 ps/nm/km and greater than −145 ps/nm/km at 1550 nm.

2. The optical fiber of claim 1 further comprising a kappa, defined as the total dispersion at 1550 nm divided by the total dispersion slope at 1550 nm, of between about 240 and 335 nm.

3. The optical fiber of claim 1 wherein the total dispersion slope at 1550 nm is less than −0.41 ps/nm²/km and greater than −0.47 ps/nm²/km.

4. The optical fiber of claim 1 wherein the total dispersion at 1550 nm is less than −120 ps/nm/km and greater than −132 ps/nm/km.

5. A dispersion compensating module including the dispersion compensating optical fiber of claim 1.

6. An optical fiber transmission system, comprising:
    a standard single mode transmission fiber having a total dispersion between 14 and 21 ps/nm/km at 1550 nm; and
    the dispersion compensating fiber of claim 1 optically coupled to the standard single mode transmission fiber;
    wherein for all wavelengths within a transmission wavelength band between 1525 nm to 1570 nm, the transmission system exhibits a residual dispersion of less than ±15 ps/nm per 100 km of the standard single mode transmission fiber.

7. The optical fiber transmission system of claim 6 wherein the residual dispersion is less than ±10 ps/nm per 100 km of the standard single mode transmission fiber.

8. The optical fiber of claim 1 wherein
    the core outer radius ($r_1$) of the central core segment is between 1.4 and 1.9 microns;
    the outer radius ($r_2$) of the moat segment is between 3.9 and 5.3 microns; and
    the center radius ($r_3$) of the ring segment is between 5.5 and 7.7 microns.

9. The optical fiber of claim 1 wherein the ring offset (Xo) is between 0.75 and 2.0 µm.

10. The optical fiber of claim 1 further comprising a figure of merit (FOM), defined as an absolute value of total dispersion at 1550 nm divided by attenuation at 1550 nm, having an absolute value greater than 240 ps/nm/dB.

11. The optical fiber of claim 10 wherein the figure of merit (FOM) has an absolute value greater than 275 ps/nm/dB.

12. The optical fiber of claim 1 further comprising a core/moat ratio, defined as the core radius ($r_1$) divided by the moat outer radius ($r_2$) of between 0.33 and 0.39.

13. The optical fiber of claim 1 wherein an effective area ($A_{eff}$) at 1550 nm is greater than 19 square microns.

14. The optical fiber of claim 1 wherein Δ1 is greater than 1.5% and less than 2.1%.

15. The optical fiber of claim 1 wherein Δ2 is less than −0.30% and greater than −0.50%.

16. The optical fiber of claim 1 wherein Δ3 is greater than 0.24% and less than 0.54%.

17. The optical fiber of claim 1 further comprising a kappa, defined as the total dispersion at 1550 nm divided by the total dispersion slope at 1550 nm, of between 250 and 320 nm.

18. The optical fiber of claim 17 further comprising a kappa, defined as the total dispersion at 1550 nm divided by the total dispersion slope at 1550 nm, of between 275 and 300 nm.

19. The optical fiber of claim 1 further comprising a ring width (Wr) of between 0.8 and 2.2 µm.

20. The optical fiber of claim 1 further comprising a ring offset (Xo) greater than 0.75 µm.

21. A dispersion compensating optical fiber, comprising:
    a refractive index profile having
        a central core segment with a relative refractive index ($\Delta_1$) between 2.1% and 1.5% and an outer radius ($r_1$) of between 1.40 and 1.9 µm, a moat segment surrounding the central core segment with a relative refractive index ($\Delta_2$) of between −0.3 and −0.5% and a moat outer radius ($r_2$) between 3.9 and 5.3 μm, and a ring segment surrounding the moat segment with a relative refractive index ($\Delta_3$) of between 0.24 and 0.54%, a ring radius ($r_3$) to a center of the ring segment of between 5.5 and 7.7 μm, a ring width ($W_r$) measured at one-half the relative refractive index ($\Delta_3$) of the central core segment wherein the ring segment is offset from the moat outer radius ($r_2$) by a ring offset ($X_o$) greater than 0.75 μm wherein $X_o = r_3 - r_2 - Wr/2$, and the refractive index profile results in
- a total dispersion of less than −120 ps/nm/km and greater than −145 ps/nm/km at a wavelength of 1550 nm,
- a total dispersion slope of less than −0.40 and greater than −0.55 ps/nm²/km at a wavelength of 1550 nm; and
- a kappa, defined as the total dispersion at 1550 nm divided by the dispersion slope at 1550 nm, of between 250 and 320 nm.

22. A dispersion compensating optical fiber, comprising:
a refractive index profile having
a central core segment with a relative refractive index ($\Delta_1$) less than 2% and an outer radius ($r_1$) of between 1.5 and 2.0 μm, a moat segment surrounding the central core segment with a relative refractive index ($\Delta_2$) of between −0.3 and −0.5% and a moat outer radius ($r_2$) between 3.9 and 5.3 μm, and a ring segment surrounding the moat segment with a relative refractive index ($\Delta_3$) of between 0.25 and 0.54%, a ring radius ($r_3$) to a center of the ring segment of between 5.5 and 7.7 μm, a ring width ($W_r$) measured at one-half the relative refractive index ($\Delta_3$) of the central core segment wherein the ring segment is offset from the moat outer radius ($r_2$) by a ring offset ($X_o$) greater than 0.8 μm wherein $X_o = r_3 - r_2 - Wr/2$, and the refractive index profile results in
- a total dispersion of less than −120 ps/nm/km and greater than −145 ps/nm/km at a wavelength of 1550 nm,
- a total dispersion slope of less than −0.42 and greater than −0.55 ps/nm²/km at a wavelength of 1550 nm;
- a kappa, defined as the total dispersion at 1550 nm divided by the dispersion slope at 1550 nm, of between 240 and 325 nm;
- a mode field diameter at 1550 nm greater than 5.0 μm; and
- a figure of merit, defined as the absolute value of total dispersion at 1550 nm divided by the attenuation at 1550 nm, of greater than 260 nm.

* * * * *